United States Patent
Suzuki

(10) Patent No.: US 9,127,146 B2
(45) Date of Patent: Sep. 8, 2015

(54) RUBBER COMPOSITION AND TIRE USING THE SAME

(75) Inventor: Eiju Suzuki, Kodaira (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 14/116,204

(22) PCT Filed: May 31, 2012

(86) PCT No.: PCT/JP2012/003599
§ 371 (c)(1),
(2), (4) Date: Nov. 7, 2013

(87) PCT Pub. No.: WO2012/164944
PCT Pub. Date: Dec. 6, 2012

(65) Prior Publication Data
US 2014/0080969 A1  Mar. 20, 2014

(30) Foreign Application Priority Data
Jun. 3, 2011  (JP) ................ 2011-125608

(51) Int. Cl.
C08L 9/08 (2006.01)
C08L 9/06 (2006.01)
B60C 1/00 (2006.01)
C08L 21/02 (2006.01)
C08F 236/10 (2006.01)
C08C 1/14 (2006.01)

(52) U.S. Cl.
CPC ............ *C08L 9/06* (2013.01); *B60C 1/0016* (2013.01); *C08C 1/14* (2013.01); *C08F 236/10* (2013.01); *C08L 9/08* (2013.01); *C08L 21/02* (2013.01)

(58) Field of Classification Search
CPC ......... B60C 1/0016; C08L 9/06; C08L 21/02; C08F 236/10
USPC .............. 523/335; 524/575; 525/237
See application file for complete search history.

(56) References Cited

U.S. PATENT DOCUMENTS

| 5,153,255 A | 10/1992 | Kondo et al. |
| 5,232,987 A | 8/1993 | Sakakibara et al. |
| 6,166,140 A | 12/2000 | Sandstrom et al. |
| 6,469,104 B1 * | 10/2002 | Colvin et al. ............. 525/241 |
| 2002/0077408 A1 | 6/2002 | Rauline |

FOREIGN PATENT DOCUMENTS

| CN | 1230564 A | 10/1999 |
| EP | 0328284 A1 | 8/1989 |
| EP | 0405904 A1 | 1/1991 |
| EP | 0942042 A2 | 9/1999 |
| GB | 1041309 | 9/1966 |
| JP | 1-197541 A | 8/1989 |
| JP | 3-26732 A | 2/1991 |
| JP | 2000-17021 A | 1/2000 |
| WO | 2005/087858 A1 | 9/2005 |

OTHER PUBLICATIONS

European Tyre School; Module 6; Introduction to Elastomers; Styrenebutadiene rubber (SBR) (1999) https://www.tut.fi/ms/muo/tyreschool/teachingmodules.html.*
International Search Report of PCT/JP2012/003599 dated Jul. 3, 2012.
Office Action dated Sep. 2, 2014 from The State Intellectual Property Office of P.R. China in counterpart Chinese Patent Application No. 201280027328.1.
Communication dated Dec. 5, 2014 from the European Patent Office in counterpart European Application No. 12792732.5.
Communication dated Oct. 28, 2014 from the Japanese Patent Office in counterpart Japanese Application No. 2013-517888.
Communication dated Dec. 26, 2014, issued by the Russian Patent Office in corresponding Russian Application No. 2013153236/05.
Communication dated Mar. 6, 2015, issued by the Russian Patent Office in corresponding Russian Application No. 2013153236/05.

* cited by examiner

*Primary Examiner* — Edward Cain
(74) *Attorney, Agent, or Firm* — Sughrue Mion, PLLC

(57) ABSTRACT

The invention relates to a rubber composition having better workability and fracture resistance than the prior art, and more specifically, to a rubber composition containing a polymer (B) obtained from an emulsion-polymerized polymer latex (A) having a number average molecular weight in the range of 1,000-130,000.

12 Claims, No Drawings

RUBBER COMPOSITION AND TIRE USING THE SAME

CROSS REFERENCE TO RELATED APPLICATIONS

This is a National Stage of International Application No. PCT/JP2012/003599 filed May 31, 2012, claiming priority based on Japanese Patent Application No. 2011-125608 filed Jun. 3, 2011, the contents of all of which are incorporated herein by reference in their entirety.

TECHNICAL FIELD

The present invention relates to a rubber composition and tire using the same. In particular, the present invention relates to a rubber composition with excellent workability and fracture resistance.

BACKGROUND ART

Generally, rubber compositions used for rubber articles such as tires are prepared by blending rubber components with various compounding agents such as fillers and vulcanizing agents and kneading them. Here, in order to improve workability in the kneading of a mixture prepared by adding compounding agents such as fillers to rubber components, oil components such as process oil are usually added to the mixture. Further, attempts have been made to improve physical properties of the rubber composition, by using liquid polymers as such oil components or using low molecular weight polymers as an alternative to the oil components.

For example, WO 2005/087858 A (PTL 1) discloses that a rubber composition having a high storage elastic modulus and a low loss factor while having excellent fracture resistance can be obtained without impairing the workability of the rubber composition, by adding an aromatic vinyl compound-diene compound copolymer having a weight-average molecular weight of 5,000 to 300,000 instead of the oil component. Further, in WO 2005/087858 A, from the viewpoint of reducing the loss factor of the rubber composition, and in order to obtain an aromatic vinyl compound-diene compound copolymer with a relatively narrow molecular weight distribution, an aromatic vinyl compound-diene compound copolymer is synthesized by solution polymerization using an organic lithium compound as an initiator. The aromatic vinyl compound-diene compound copolymer thus synthesized is used in the rubber composition.

CITATION LIST

Patent Literature

PTL 1: WO 2005/087858 A

SUMMARY OF INVENTION

Technical Problem

However, even for a rubber composition containing a polymer of a relatively low molecular weight such as the one disclosed in PTL 1, there is room for improvement in terms of workability and fracture resistance, and a rubber composition with better workability and fracture resistance is required.

Accordingly, an object of the present invention is to provide a rubber composition having better workability and fracture resistance compared to the prior art described above.

Another object of the present invention is to provide a tire with high productivity and excellent fracture resistance, using such a rubber composition.

Solution to Problem

As a result of intensive studies to achieve the above objects, the inventors of the present invention found that the workability and the fracture resistance of the rubber composition are significantly improved, by adding to the rubber composition a polymer having a relatively low number average molecular weight obtained from an emulsion-polymerized polymer latex. This led to the completion of the present invention.

More specifically, the rubber composition of the present invention contains a polymer (B) obtained from an emulsion-polymerized polymer latex (A) with a number average molecular weight in the range of 1,000 to 130,000.

It is preferable for the rubber composition of the present invention to further contain a polymer (D) obtained from an emulsion-polymerized polymer latex (C) with a number average molecular weight exceeding 130,000.

It is preferable for the rubber composition of the present invention to contain a polymer (E) obtained by mixing the emulsion-polymerized polymer latex (A) with the emulsion-polymerized polymer latex (C) and then coagulating and drying the mixture. Here, the Mooney viscosity of the polymer (E) is preferably within the range of 10 to 200, and the molecular weight distribution (Mw/Mn) of the polymer (E) is preferably within the range of 3.0 to 7.0.

In a preferable embodiment of the rubber composition of the present invention, at least one of the emulsion-polymerized polymer latex (A) and the emulsion-polymerized polymer latex (C) is a latex of a diene-based polymer.

In another preferable embodiment of the rubber composition of the present invention, at least one of the emulsion-polymerized polymer latex (A) and the emulsion-polymerized polymer latex (C) is a latex of a copolymer of a diene compound and an aromatic vinyl compound. Here, a difference between a content of aromatic vinyl compound of the polymer (B) obtained from the emulsion-polymerized polymer latex (A) and a content of aromatic vinyl compound of the polymer (D) obtained from the emulsion-polymerized polymer latex (C) is preferably 10 mass % or less.

In another preferable embodiment of the rubber composition of the present invention, the content of aromatic vinyl compound of the polymer (B) obtained from the emulsion-polymerized polymer latex (A) is 5 mass % to 60 mass %, and/or the polymer (B) obtained from the emulsion-polymerized polymer latex (A) has a vinyl bond content in a diene compound portion of 10 mass % to 30 mass %.

It is preferable for the rubber composition of the present invention to further contain a rubber component (F) other than the polymer (D), and/or to further contain a filler (G). Further, the rubber composition is preferably sulfur-crosslinkable.

Further, the tire of the present invention is manufactured by using the above rubber composition. In the tire of the present invention, the above rubber composition is preferably used in a tread.

Advantageous Effect of Invention

According to the present invention, with the addition of the polymer (B) obtained from the emulsion-polymerized polymer latex (A) and having a number average molecular weight in the range of 1,000 to 130,000, a rubber composition with significantly improved workability and fracture resistance can be provided. Further, according to the present invention, a tire using such a rubber composition, with high productivity and excellent fracture resistance can be provided.

DESCRIPTION OF EMBODIMENTS

<Rubber Composition>

The details of the rubber composition of the present invention will be described below. The rubber composition of the present invention contains a polymer (B) obtained from an emulsion-polymerized polymer latex (A) with a number average molecular weight (Mn) in the range of 1,000 to 130,000. Since the polymer (B) in the polymer latex (A) obtained through the emulsion polymerization grows by chain propagation through radical polymerization, it has a wide molecular weight distribution and many branch points. Accordingly, by adding the above polymer (B) to the rubber composition, the viscosity in the unvulcanized state decreases and the workability of the rubber composition can be improved. Moreover, since the polymer (B) has a portion that can be crosslinked with the rubber component of the matrix, unlike an oil component such as process oil which was conventionally used for addition to a rubber composition, it is possible to improve the fracture resistance of the vulcanized rubber obtained by vulcanizing the rubber composition. In addition, since a polymer with a number average molecular weight (Mn) of less than 1,000 is not involved with crosslinking, hysteresis loss of the rubber composition increases, and the fracture resistance of the rubber composition cannot be sufficiently improved. On the other hand, the polymer (B) with a number average molecular weight (Mn) exceeding 130,000 cannot sufficiently improve the workability of the rubber composition. From the viewpoint of workability and fracture resistance of the rubber composition, the number average molecular weight (Mn) of the above polymer (B) is preferably within the range of 30,000 to 100,000, and particularly preferably within the range of 50,000 to 80,000. From the viewpoint of workability of the rubber composition, the molecular weight distribution (Mw/Mn) of the polymer (B) is preferably within the range of 2.0 to 4.0.

It is preferable for the rubber composition of the present invention to further contain a polymer (D) obtained from an emulsion-polymerized polymer latex (C) with a number-average molecular weight (Mn) exceeding 130,000. Since the polymer (D) in the polymer latex (C) obtained through emulsion polymerization also grows by chain propagation through radical polymerization, it has a wide molecular weight distribution and many branch points. Accordingly, by using the polymer (D) resulting from emulsion polymerization with relatively high molecular weight as a rubber component of the matrix, it is possible to further improve the workability of the rubber composition. The number average molecular weight (Mn) of the polymer (D) is preferably 140,000 or more from the viewpoint of fracture properties of the rubber composition, and preferably 1,400,000 or less from the viewpoint of workability of the rubber composition. Further, the molecular weight distribution (Mw/Mn) of the polymer (D) is preferably within the range of 2.0 to 5.0 from the viewpoint of workability of the rubber composition.

It is preferable for the rubber composition of the present invention to contain a polymer (E) obtained by mixing the emulsion-polymerized polymer latex (A) having a number average molecular weight (Mn) within the range of 1,000 to 130,000 with the emulsion-polymerized polymer latex (C) having a number average molecular weight (Mn) exceeding 130,000 and then coagulating and drying the mixture. In this case, since the polymer (B) and the polymer (D) are blended in the state of latex, the resulting polymer (E) has higher homogeneity and more improved fracture resistance as compared to when the polymer (B) and the polymer (D) are blended individually. In addition to normal stirrers, homogenizers and the like can be used for the mixture of the latex (A) with the latex (C). The coagulation of the mixed latex is usually carried out by using a coagulant including, for example, an acid such as formic acid and sulfuric acid and a salt such as sodium chloride. Any solids obtained after the coagulation may be dried by using a normal dryer, such as a vacuum dryer, an air dryer, a drum dryer and a band dryer.

The Mooney viscosity of the above polymer (E) is preferably within the range of 10 to 200. Here, the Mooney viscosity of the polymer (E) refers to the value of the Mooney viscosity measured at 100° C. ($ML_{1+4}$, 100° C.). If the Mooney viscosity of the polymer (E) is 10 or more, fracture resistance of the rubber composition can be sufficiently improved and if the Mooney viscosity of the polymer (E) is 200 or less, the workability of the rubber composition can be sufficiently improved.

The molecular weight distribution (Mw/Mn) of the above polymer (E) is preferably within the range of 3.0 to 7.0. Here, the molecular weight distribution is the ratio (Mw/Mn) of the weight average molecular weight (Mw) and the number average molecular weight (Mn) of the polymer (E). The weight average molecular weight (Mw) and the number average molecular weight (Mn) are values in terms of polystyrene measured by gel permeation chromatography. If the molecular weight distribution (Mw/Mn) of the polymer (E) is 3.0 or more, workability of the rubber composition can be sufficiently improved, and as long as molecular weight distribution (Mw/Mn) of the polymer (E) is 7.0 or less, there is little adverse effect on heat buildup and durability. Further, from these viewpoints, it is further preferable for the molecular weight distribution (Mw/Mn) of polymer (E) to be within the range from 3.0 to 6.0 and even more preferable for it to be within the range of 3.3 to 5.0.

At least one of the above emulsion-polymerized polymer latex (A) and the above emulsion-polymerized polymer latex (C) is preferably a latex of a diene-based polymer, and more preferably a latex of a copolymer of a diene compound and an aromatic vinyl compound. Diene-based polymers are highly practical, and copolymers of diene compounds and aromatic vinyl compounds are particularly practical and can be preferably used for rubber compositions for tire treads. Here, a diene-based polymer refers to a polymer that at least contains a unit resulting from a diene compound, and includes in addition to a homopolymer of a diene compound, a copolymer of a diene compound and a comonomer copolymerizable with the diene compound. Here, examples of the comonomer include aromatic vinyl compounds and many other vinyl compounds. The content of diene compound in the diene-based polymer is preferably in the range of 40 mass % to 100 mass %.

Examples of the above diene compound include 1,3-butadiene, isoprene, 1,3-pentadiene, 2,3-dimethyl-butadiene, 2-phenyl-1,3-butadiene, 1,3-hexadiene and the like. Among these, 1,3-butadiene is preferable in terms of availability and practicality. These diene compounds may be used alone or in combination of two or more.

Further, the above aromatic vinyl compounds include for example, styrene, α-methyl styrene, 1-vinyl naphthalene, 3-vinyl toluene, ethyl vinyl benzene, divinyl benzene, 4-cyclohexyl styrene, 2,4,6-trimethyl styrene and the like. Among these, styrene is preferable in terms of availability and practicality. These aromatic vinyl compounds may be used alone or in combination of two or more.

The difference between a content of aromatic vinyl compound of the polymer (B) obtained from the above emulsion-polymerized polymer latex (A) and a content of aromatic vinyl compound of the polymer (D) obtained from the above emulsion-polymerized polymer latex (C) is preferably 10% or less, and more preferably less than 5%. If the difference between the content of aromatic vinyl compound of the polymer (B) and the content of aromatic vinyl compound of the polymer (D) is 10% or less, compatibility between the polymer (B) and the polymer (D) is improved. If the difference between the content of aromatic vinyl compound of the polymer (B) and the content of aromatic vinyl compound of the polymer (D) is less than 5%, compatibility between the polymer (B) and the polymer (D) is very much improved.

The content of aromatic vinyl compound of the polymer (B) obtained from the above emulsion-polymerized polymer latex (A), and the content of aromatic vinyl compound of the polymer (D) obtained from the above emulsion-polymerized polymer latex (C) are each preferably within the range of 5 mass % to 60 mass %. By appropriately setting the content of aromatic vinyl compound of the polymer (B) and of the polymer (D), it is possible to adjust the glass transition temperature (Tg) of the product using the rubber composition of the present invention. From the viewpoint of wear resistance, heat buildup, wet grip properties, the content of aromatic vinyl compound of the polymer (B) obtained from the above emulsion-polymerized polymer latex (A), and the content of aromatic vinyl compound of the polymer (D) obtained from the above emulsion-polymerized polymer latex (C) are preferably within the range of 10 mass % to 50 mass %, particularly preferably within the range of 20 mass % to 45 mass %.

The vinyl bond content in the diene compound portion of the polymer (B) obtained from the above emulsion-polymerized polymer latex (A) and the vinyl bond content in the diene compound portion of the polymer (D) obtained from the above emulsion-polymerized polymer latex (C) are preferably within the range of 10 mass % to 30 mass %.

Each of the above emulsion-polymerized polymer latex (A) and the above emulsion-polymerized polymer latex (C) can be produced for example, by stirring a reaction system of the diene compound optionally with the aromatic vinyl compound at a predetermined temperature, in the presence of a dispersing agent, an emulsifier and a polymerization initiator.

The conditions of the above emulsion polymerization are not particularly limited. For example, when the total amount of monomers used is set to be 100 parts by mass, water of 100 to 500 parts by mass is normally used as the dispersing agent, and emulsion polymerization can be carried out under the polymerization temperature condition of 0° C. to 100° C., or preferably 0° C. to 80° C. It is possible to select an appropriate polymerization method for emulsion polymerization, such as a batch method, a method of supplying monomers separately or continuously, and so on. The monomer conversion rate in the emulsion polymerization is preferably 80 mass % or less, more preferably within the range of 50 mass % to 70 mass %. The emulsion polymerization polymer (B) obtained in the case where the conversion rate is 50 mass % to 70 mass % is highly effective in improving the fracture resistance of the rubber composition.

A polymerization initiator is normally used in the above emulsion polymerization. Here, the polymerization initiator is not particularly limited and various polymerization initiators for emulsion polymerization can be used. The addition method thereof is not particularly limited either. Examples of polymerization initiators commonly used include benzoyl peroxide, hydrogen peroxide, cumene hydroperoxide, tert-butyl hydroperoxide, di-tert-butyl peroxide, p-menthane hydroperoxide, 2,2-azobisisobutyronitrile, 2,2-azobis(2-diaminopropane) hydrochloride, 2,2-azobis(2-diaminopropane)dihydrochloride, 2,2-azobis(2,4-dimethylvaleronitrile), potassium persulfate, sodium persulfate, ammonium persulfate and the like. In order to decrease the polymerization temperature, it is preferable to use a redox type polymerization initiator. Reducing agents for combining with peroxides, for use in such redox polymerization initiators, include for example, tetraethylenepentamine, mercaptans, acidic sodium sulfite, a reducing metal ion, ascorbic acid and the like. Preferred combinations of the peroxide and the reducing agent for use in the redox type polymerization initiators, include a combination of tert-butyl hydroperoxide and tetraethylenepentamine, and the like.

When performing the above emulsion polymerization, it is possible to use one or more of a molecular weight modifier, a chelating agent and an inorganic electrolyte used in normal emulsion polymerization, as necessary. Here, examples of the molecular weight modifier include mercaptans such as n-hexylmercaptan, n-octylmercaptan, n-dodecylmercaptan and t-dodecylmercaptan, halogenated hydrocarbons such as chloroform, carbon tetrachloride, xanthogens such as dimethyl xanthogen disulfide, di-i-propylxanthogen disulfide, α-methyl styrene dimer, 1,1-diphenyl ethylene and the like. Here, it is possible to separately create the desired emulsion-polymerized polymer latex (A) and emulsion-polymerized polymer latex (C) by adjusting the type and the amount of addition of the molecular weight modifier (i.e., a chain transfer agent).

Examples of emulsifiers used in the above emulsion polymerization include anionic surfactants, nonionic surfactants, cationic surfactants, and amphoteric surfactants and the like. It is also possible to use a fluorine-based surfactant. These emulsifiers may be used alone or in combination of two or more. Generally, anionic surfactants are frequently used. For example, a long-chain fatty acid salt having 10 or more carbon atoms and a rosin acid salt are used. Specific examples thereof include potassium salts and sodium salts of capric acid, lauric acid, myristic acid, palmitic acid, oleic acid, stearic acid and the like. Here, the amount of the emulsifier used is preferably within the range of 0.01 to 20 parts by mass based on 100 parts by mass of the monomer, more preferably within the range of 0.5 to 10 parts by weight based on 100 parts by mass of the monomer. If the amount of the emulsifier is within the above range, a sufficiently high polymerization conversion rate is obtained.

Generally, the emulsion-polymerized polymer latex (A) and the emulsion polymerization polymer latex (C) obtained as described above are then coagulated and further dried to obtain the polymer (B) and the polymer (D). Here, the coagulation of the emulsion-polymerized polymer latex is generally carried out by using a coagulant including, for example, an acid such as formic acid and sulfuric acid and a salt such as sodium chloride. Further, any solids obtained after the coagulation may be dried by using a normal dryer, such as a vacuum dryer, an air dryer, a drum dryer and a band dryer.

It is preferable for the rubber composition of the present invention to further contain a rubber component (F) other than the above polymer (D). As this rubber component, it is possible to use natural rubber (NR) as well as styrene-butadiene copolymer rubber (SBR) which is synthesized through solution polymerization, polybutadiene rubber (BR), polyisoprene rubber (IR), butyl rubber (IIR), ethylene-propylene copolymer and the like. Among these, natural rubber and polyisoprene rubber are preferable. These rubber components may be used alone or in combination of two or more.

It is preferable for the rubber composition of the present invention to further contain a filler (G). The amount of the added filler (G) is preferably within the range of 10 to 150 parts by mass based on 100 parts by mass of a rubber component (H) of the matrix. In the present invention, the rubber component (H) refers to a component having rubber elasticity, with a number average molecular weight exceeding 130,000; the polymer components of the above polymer (D) and of the above polymer (E), and the above rubber component (F) are applicable. Here, although the filler (G) is not particularly limited, carbon black and silica are preferred from the viewpoint of reinforcement of the rubber composition. Further, for carbon black, those of FEF, SRF, HAF, ISAF and SAF grades are preferred and those of FEF, HAF, ISAF and SAF grades are more preferred. On the other hand, for silica, wet silica and dry silica are preferred, and wet silica is more preferred. If the amount of the added filler (G) is 10 parts by mass or more based on 100 parts by mass of the above rubber component (H), it is possible to sufficiently improve fracture resistance of the rubber composition. If the amount of the added filler (G) is 150 parts by mass or less based on 100 parts by mass of the rubber component (H), it is possible to sufficiently improve the workability of the rubber composition.

For the rubber composition of the present invention, compounding agents that are commonly used in the rubber industry, for example, antioxidants, silane coupling agents, vulcanization accelerators, vulcanization accelerator aids, vulcanizing agents and the like may be appropriately selected and mixed without departing from the object of the present invention, in addition to the above rubber component (H), polymer (B) and filler (G). Commercially available products may be preferably used as these additives. The above rubber composition can be produced by adding the polymer (B) and various compounding agents which are optionally selected as appropriate to the rubber component (H), and then subjecting the product to kneading, heating, extrusion and other processes.

The rubber composition of the present invention is preferably sulfur-crosslinkable, i.e., it may preferably be crosslinked by heating when including sulfur. Although the amount of sulfur added is not particularly limited, it is preferably within the range of, for example, 1 to 10 parts by mass based on 100 parts by mass of the rubber component (H). If the rubber composition is sulfur-crosslinkable, not only the rubber component (H) but also the polymer (B) are involved in the crosslinking of the rubber composition by sulfur, and the fracture resistance of the rubber composition is greatly improved.

<Tire>

The tire of the present invention is characterized by using the above rubber composition, which is preferably used in the tread of the tire. Since the tire of the present invention uses the above rubber composition having excellent workability and fracture resistance, it has high productivity as well as excellent fracture resistance. There is no particular limitation with regard to the tire of the present invention except for the fact that the above rubber composition is used for any of the rubber members of the tire. The tire of the present invention may be prepared according to conventional methods. In a case where the tire is a pneumatic tire, inert gas such as nitrogen, argon and helium may be used in addition to normal air or air with adjusted oxygen partial pressure, as gas to fill the pneumatic tire.

EXAMPLES

The present invention will be described in more detail below with reference to examples thereof. However, the present invention is not intended to be limited to the following examples. Unless otherwise mentioned herein, "parts" refers to "parts by mass". In the following examples, (1) number average molecular weight (Mn), weight average molecular weight (Mw), microstructure, bound styrene content, and Mooney viscosity of polymers and (2) Mooney viscosity, tensile strength (Tb), and abrasion resistance of rubber compositions were respectively measured by the following methods.

(1-1) Number Average Molecular Weight (Mn) and Weight Average Molecular Weight (Mw) of Polymer The number average molecular weight (Mn) and the weight average molecular weight (Mw) of each polymer converted to polystyrene were obtained using gel permeation chromatography [GPC: Tosoh HLC-8020, Column: Tosoh GMH-XL (two columns in series), detector: differential refractometer (RI)], on the basis of monodisperse polystyrene.

(1-2) Microstructure and Bound Styrene Content of Polymer

The microstructure of each polymer obtained was determined with the infrared method (Morello method), and the bound styrene content was determined from the integral ratio of $^1$H-NMR spectrum.

(1-3) Mooney Viscosity of Polymer

In accordance with JIS K6300-1994, the Mooney viscosity of each polymer was measured at 100° C. ($ML_{1+4}$, 100° C.).

(2-1) Mooney Viscosity of Rubber Composition

In accordance with JIS K6300-1994, the Mooney viscosity of each rubber composition was measured at 130° C. ($ML_{1+4}$, 130° C.). The results are shown by index in Table 3 with a score of 100 representing the result of comparative example 1, and in Table 5 with a score of 100 representing the result of comparative example 3. Smaller index values indicate lower Mooney viscosity, meaning better workability.

(2-2) Tensile Strength (Tb) of Rubber Composition

Tensile strength (Tb) of the vulcanized rubber obtained by vulcanizing each rubber composition for 33 minutes at 145° C. was measured at 100° C. in accordance with JIS K6251-1993. The results are shown by index in Table 3 with a score of 100 representing the result of comparative example 1, and in Table 5 with a score of 100 representing the result of comparative example 3. Larger index values indicate higher tensile strength (Tb), meaning better fracture resistance.

(2-3) Abrasion Resistance of Rubber Composition

Abrasion loss at 25° C. and slip ratio 60% of a vulcanized rubber obtained by vulcanizing each rubber composition at 145° C. for 33 minutes was measured by using a Lambourn type abrasion tester. The reciprocal of the abrasion loss of each example is shown by index in Table 3 with a score of 100 representing the reciprocal of the abrasion loss of comparative example 1, and in Table 5 with a score of 100 representing the reciprocal of the abrasion loss of comparative example 3. Larger index values indicate smaller abrasion loss, meaning better abrasion resistance.

Production Example 1 of Low Molecular Weight Emulsion-Polymerized Polymer Latex

A nitrogen-purged polymerization vessel was fed with 200 parts of water, 4.5 parts of rosin acid soap, 71 parts of butadiene, and 29 parts of styrene, and 0.37 part of t-dodecylmercaptan. Then, the temperature of the polymerization vessel was set to 5° C. and the polymerization was initiated by adding 0.05 part of p-menthane hydroperoxide as a polymerization initiator, 0.04 part of sodium ethylenediaminetetraacetate, 0.01 part of ferrous sulfate heptahydrate, and 0.04 part of sodium formaldehyde sulfoxylate. When the polymerization conversion rate reached 60%, diethylhydroxylamine was added to terminate the polymerization. Then, the unreacted monomers were distilled off to obtain a low molecular weight emulsion-polymerized polymer latex (A-1). Subsequently, formic acid was added to the obtained emulsion-polymerized polymer latex (A-1) and the pH was adjusted to 4.7 to coagulate the latex. The solid obtained in this manner was dried to obtain a polymer (B-1). The number average molecular weight (Mn), the weight average molecular weight (Mw), the vinyl bond content in the butadiene portion, and the bound styrene content of the obtained polymer (B-1) are shown in Table 1.

Production Examples 2 to 5 of Low Molecular Weight Emulsion-Polymerized Polymer Latex Production conditions were the same as production example 1 of the above low molecular weight emulsion-polymerized polymer latex, except for the fact that the amount of t-dodecylmercaptan added was changed. Low molecular weight emulsion-polymerized polymer latexes (A-2), (A-3), (A-4), (A'-5) were synthesized, and further coagulated and dried to obtain polymers (B-2), (B-3), (B-4), (B'-5). The number average molecular weight (Mn), weight average molecular weight (Mw), vinyl bond content in the butadiene portion and bound styrene content of the obtained polymers (B-2), (B-3), (B-4), (B'-5) are shown in Table 1.

Production Example 6 of Low Molecular Weight Emulsion-Polymerized Polymer Latex

Production conditions were the same as the above production example 1 of the above low molecular weight emulsion-polymerized polymer latex, except for the fact that the number of parts of monomers fed was changed to 55 parts of butadiene and 45 parts of styrene. Low molecular weight emulsion-polymerized polymer latex (A-6) was synthesized, and further coagulated and dried to obtain polymer (B-6). The number average molecular weight (Mn), weight average molecular weight (Mw), vinyl bond content in the butadiene portion, and bound styrene content of the obtained polymer (B-6) is shown in Table 1.

TABLE 2

| Added component | parts by mass |
|---|---|
| SBR synthesized through solution polymerization *1 | 100 |
| Carbon black of ISAF grade *2 | 65 |
| Polymer (B) or oil *3 | 10 |
| Stearic acid | 2 |
| Zinc oxide | 2 |
| Antioxidant 6PPD *4 | 1 |
| Vulcanization accelerator DPG *5 | 0.4 |
| Vulcanization accelerator TBBS *6 | 1 |
| Sulfur | 1.75 |

*1: "Duradene 739" by Firestone Polymers, LLC, Mn = 380,000, bound styrene content (mass %) = 20%
*2: "Seast 3H" by Tokai Carbon Co., Ltd.
*3: The types of polymers (B) or oils used are shown in Table 3
*4: "Nocrac 6C" by Ouchi Shinko Chemical Industrial Co., Ltd., N-(1,3-dimethyl butyl)-N'-phenyl-p-phenylenediamine
*5: "Nocceler D" by Ouchi Shinko Chemical Industrial Co., Ltd., diphenyl guanidine
*6: "Nocceler NS" by Ouchi Shinko Chemical Industrial Co., Ltd., N-t-butyl-2-benzothiazylsulphenamide

TABLE 3

| | | Evaluation Results of rubber compositions | | |
|---|---|---|---|---|
| | Type of Polymer (B) or oil | Mooney viscosity (index) | Tensile strength (Tb) (index) | Abrasion Resistance (index) |
| Example 1 | Polymer (B-1) | 108 | 135 | 115 |
| Example 2 | Polymer (B-2) | 105 | 123 | 111 |
| Example 3 | Polymer (B-3) | 112 | 132 | 117 |
| Example 4 | Polymer (B-4) | 124 | 121 | 109 |
| Comparative example 1 | Oil *7 | 100 | 100 | 100 |
| Comparative example 2 | Polymer (B'-5) | 172 | 115 | 104 |
| Example 5 | Polymer (B-6) | 107 | 119 | 109 |

*7: "Diana Process Oil AH" by Idemitsu Kosan Co., Ltd.

It can be seen from Table 3, that with the addition of the polymer (B) resulting from emulsion polymerization with a number average molecular weight of 1,000 to 130,000 in place of oil, fracture resistance such as tensile strength, abrasion resistance are improved without greatly increasing the Mooney viscosity of the rubber composition.

TABLE 1

| | Amount of t-dodecylmercaptan added (parts) | Mn | Mw | Vinyl bond content (mass %) | Bound styrene content (mass %) |
|---|---|---|---|---|---|
| Polymer (B-1) | 0.37 | 65,000 | 140,000 | 19 | 22 |
| Polymer (B-2) | 0.40 | 53,000 | 117,000 | 19 | 22 |
| Polymer (B-3) | 0.35 | 73,000 | 168,000 | 19 | 23 |
| Polymer (B-4) | 0.25 | 105,000 | 252,000 | 19 | 23 |
| Polymer (B'-5) | 0.18 | 142,000 | 430,000 | 19 | 23 |
| Polymer (B-6) | 0.37 | 63,000 | 137,000 | 19 | 37 |

<Evaluation of the Rubber Composition>

Rubber compositions formulated as shown in Table 2 were prepared by using polymers (B-1) to (B-4), (B'-5) and (B-6) obtained as described above and the Mooney viscosity, tensile strength (Tb) and abrasion resistance of the obtained rubber compositions were evaluated. The results are shown in Table 3.

Production Example 1 of High Molecular Weight Emulsion-Polymerized Polymer Latex A nitrogen-purged polymerization vessel was fed with 200 parts of water, 4.5 parts of rosin acid soap, 71 parts of butadiene, 29 parts of styrene, and 0.13 part of t-dodecylmercaptan. Then, the temperature of the polymerization vessel was set to 5° C. and the polymerization was initiated after adding to the vessel 0.05 part of p-menthane hydroperoxide as a polymerization initiator, 0.04 part of sodium ethylenediaminetetraacetate, 0.01 part of ferrous sulfate heptahydrate, and 0.04 part of sodium formaldehyde sulfoxylate. When the polymerization conversion rate reached 60%, diethylhydroxylamine was added to terminate the polymerization. Then, the unreacted monomers were distilled off to obtain a high molecular weight emulsion-polymerized polymer latex (C-1). Subsequently, formic acid was added to the obtained emulsion-polymerized polymer latex (C-1) and the pH was adjusted to 4.7 to coagulate the latex. After the thus obtained solid was treated with a scraper five times, it was put through a shredder and made into crumbs, and then it was dried with a hot air dryer for 210 minutes at 110° C. to obtain a polymer (D-1). The obtained polymer (D-1) had a number average molecular weight (Mn) of 220,000, a weight average molecular weight (Mw) of 650,000, a vinyl bond content in the butadiene portion of 19 mass %, and bound styrene content of 24 mass %.

Mixture Example 1 of Polymer Latex

In this case, 100 parts by mass of the above emulsion polymerized polymer latex (C-1) (solid content: 20 mass %), and 34 parts by mass of the above emulsion-polymerized polymer latex (A-1) (solid content: 20 mass %) were mixed and stirred. Subsequently, formic acid was added and the pH was adjusted to 4.7 to coagulate the latex. After the solid thus obtained was treated with a scraper five times, it was put through a shredder and made into crumbs, and then it was dried with a hot air dryer for 210 minutes at 110° C. to obtain a polymer (E-1). The content of the polymer (D-1) derived from the latex (C-1) in the polymer (E-1) was 75 mass % and the content of the polymer (B-1) derived from the latex (A-1) was 25 mass %. The number average molecular weight (Mn), weight average molecular weight (Mw) and molecular weight distribution (Mw/Mn) of the obtained polymer (E-1) are shown in Table 4.

Mixture Examples 2 to 4 of Polymer Latex

Polymers (E-2), (E-3), and (E-4) were obtained in the same manner as mixture example 1 of the above polymer latex, except for the fact that polymer latexes (A-2), (A-3), and (A-4) were used in place of the polymer latex (A-1). The number average molecular weight (Mn), weight average molecular weight (Mw), molecular weight distribution (Mw/Mn) and Mooney viscosity of the obtained polymers (E-2), (E-3) and (E-4) are shown in Table 4.

TABLE 4

|  | Mn | Mw | Mw/Mn | Mooney viscosity (ML$_{1+4}$, 100° C.) |
|---|---|---|---|---|
| Polymer (E-1) | 125,000 | 563,000 | 4.5 | 63 |
| Polymer (E-2) | 105,000 | 494,000 | 4.7 | 59 |
| Polymer (E-3) | 144,000 | 619,000 | 4.3 | 67 |
| Polymer (E-4) | 196,000 | 648,000 | 3.3 | 78 |

<Evaluation of Physical Properties of Rubber Composition>

Rubber compositions formulated as shown in Table 5 were prepared by using the polymers (E-1) to (E-4) obtained as described above, and the Mooney viscosity, tensile strength (Tb) and abrasion resistance of the obtained rubber compositions were evaluated. The results are shown in Table 5.

TABLE 5

|  |  |  | Example 6 | Example 7 | Example 8 | Example 9 | Comparative Example 3 | Comparative Example 4 |
|---|---|---|---|---|---|---|---|---|
| Formulation | SBR synthesized through solution polymerization *1 | parts by mass | 50 | 50 | 50 | 50 | 50 | 50 |
|  | Polymer (D-1) | mass | — | — | — | — | 50 | 67 |
|  | Polymer (E-1) |  | 67 | — | — | — | — | — |
|  | Polymer (E-2) |  | — | 67 | — | — | — | — |
|  | Polymer (E-3) |  | — | — | 67 | — | — | — |
|  | Polymer (E-4) |  | — | — | — | 67 | — | — |
|  | Oil *7 |  | 11 | 11 | 11 | 11 | 28 | 11 |
|  | Carbon black ISAF *2 |  | 10 | 10 | 10 | 10 | 10 | 10 |
|  | Silica *8 |  | 60 | 60 | 60 | 60 | 60 | 60 |
|  | Silane coupling agent *9 |  | 6 | 6 | 6 | 6 | 6 | 6 |
|  | Stearic acid |  | 2 | 2 | 2 | 2 | 2 | 2 |
|  | Zinc oxide |  | 2 | 2 | 2 | 2 | 2 | 2 |
|  | Antioxidant 6PPD *4 |  | 1.2 | 1.2 | 1.2 | 1.2 | 1.2 | 1.2 |
|  | Vulcanization accelerator DPG *5 |  | 0.8 | 0.8 | 0.8 | 0.8 | 0.8 | 0.8 |
|  | Vulcanization accelerator TBBS *6 |  | 1.3 | 1.3 | 1.3 | 1.3 | 1.3 | 1.3 |
|  | Sulfur |  | 1.8 | 1.8 | 1.8 | 1.8 | 1.8 | 1.8 |
| Evaluation results | Mooney viscosity | index | 110 | 107 | 114 | 126 | 100 | 168 |
|  | Tensile strength (Tb) | index | 144 | 135 | 140 | 129 | 100 | 107 |
|  | Abrasion Resistance | index | 132 | 124 | 134 | 125 | 100 | 104 |

*1, *2, *4, *5, *6, and *7: same as those in Table 2 or Table 3
*8: "Nipsil AQ ™" by Nippon Silica Industrial Co., Ltd.
*9: "Si69 ™" by Degussa, bis(3-triethoxysilylpropyl)tetrasulfide It can be seen from Table 5 that, with the addition of a blended polymer (E) obtained from the mixture of emulsion-polymerized latexes in place of the polymer (D) with a number average molecular weight exceeding 130,000 and the oil, the resulting rubber composition has a lower Mooney viscosity as well as improved tensile strength and abrasion resistance.

The invention claimed is:

1. A rubber composition comprising a polymer (B) obtained from an emulsion-polymerized polymer latex (A) with a number average molecular weight in the range of 1,000 to 130,000 and a polymer (D) obtained from an emulsion-polymerized polymer latex (C) with a number average molecular weight exceeding 130,000, wherein the polymer (B) obtained from the emulsion-polymerized polymer latex (A) has a vinyl bond content in a diene compound portion of 10 mass % to 30 mass %, the rubber composition further comprising a polymer (E) obtained by mixing the emulsion-polymerized polymer latex (A) with the emulsion-polymerized polymer latex (C) and then coagulating and drying the mixture, wherein the polymer (E) has a molecular weight distribution (Mw/Mn) within the range of 3.0 to 7.0.

2. The rubber composition according to claim 1, wherein the polymer (E) has a Mooney viscosity within the range of 10 to 200.

3. The rubber composition according to claim 1, wherein at least one of the emulsion-polymerized polymer latex (A) and the emulsion-polymerized polymer latex (C) is a latex of a diene-based polymer.

4. The rubber composition according to claim 3, wherein at least one of the emulsion-polymerized polymer latex (A) and the emulsion-polymerized polymer latex (C) is a latex of a copolymer of a diene compound and an aromatic vinyl compound.

5. The rubber composition according to claim 4, wherein a difference between a content of aromatic vinyl compound of the polymer (B) obtained from the emulsion-polymerized polymer latex (A) and a content of aromatic vinyl compound of the polymer (D) obtained from the emulsion-polymerized polymer latex (C) is 10 mass % or less.

6. The rubber composition according to claim 4, wherein the content of aromatic vinyl compound of the polymer (B) obtained from the emulsion-polymerized polymer latex (A) is 5 mass % to 60 mass %.

7. The rubber composition according to claim 1, further comprising a rubber component (F) other than the polymer (D).

8. The rubber composition according to claim 1, further comprising a filler (G).

9. The rubber composition according to claim 1, which is sulfur-crosslinkable.

10. A tire manufactured by using the rubber composition according to claim 1.

11. The tire according to claim 10, wherein the rubber composition is used in a tread of the tire.

12. The rubber composition according to claim 5, wherein the difference between the content of aromatic vinyl compound of the polymer (B) obtained from the emulsion-polymerized polymer latex (A) and the content of aromatic vinyl compound of the polymer (D) obtained from the emulsion-polymerized polymer latex (C) is less than 5 mass %.

* * * * *